United States Patent
Courtney (12)

(10) Patent No.: US 6,478,291 B1
(45) Date of Patent: Nov. 12, 2002

(54) CABLE SHOCK ABSORBING DEVICE

(75) Inventor: Stephen Benjamin Courtney, Bath (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 09/787,847

(22) PCT Filed: Sep. 15, 1999

(86) PCT No.: PCT/GB99/03065

§ 371 (c)(1),
(2), (4) Date: Mar. 23, 2001

(87) PCT Pub. No.: WO00/17980

PCT Pub. Date: Mar. 30, 2000

(30) Foreign Application Priority Data

Sep. 24, 1998 (GB) .............................................. 9820851

(51) Int. Cl.$^7$ .......................... F16M 1/00; H02G 15/007
(52) U.S. Cl. ...................................................... 267/136
(58) Field of Search ........................... 267/69, 74, 136; 114/215, 230.1

(56) References Cited

U.S. PATENT DOCUMENTS

| 4,192,493 A | | 3/1980 | Koughan |
| D259,194 S | * | 5/1981 | Koughan .................... D12/159 |
| 4,754,957 A | * | 7/1988 | Muttart ........................ 267/136 |
| 4,992,629 A | | 2/1991 | Morais |
| 5,207,302 A | | 5/1993 | Popp et al. |

* cited by examiner

Primary Examiner—Christopher P. Schwartz
(74) Attorney, Agent, or Firm—Morrison & Foerster LLP

(57) ABSTRACT

A shock absorbing device for an electrical cable includes a resilient member attachable to two spaced-apart portions of the cable, so as to bias the spaced-apart portions toward one another and to impart an arcuate shape to the cable between the spaced apart portions. The device also includes a spacer member for location between the cable and the resilient member. The spacer member can ensure that the cable and the resilient member are maintained at a minimum distance, so that when tension is applied to the cable, the resilient member is deformed, thus producing a rising spring rate effect in the device.

25 Claims, 7 Drawing Sheets

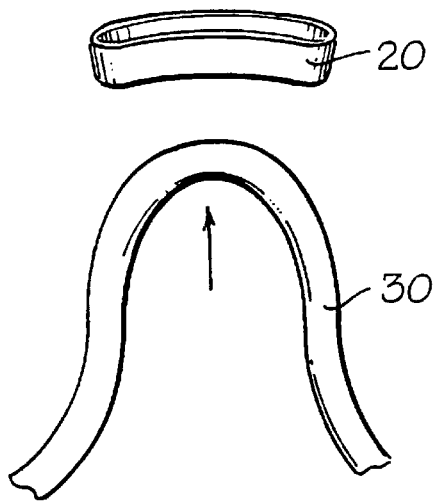
FIG 3a
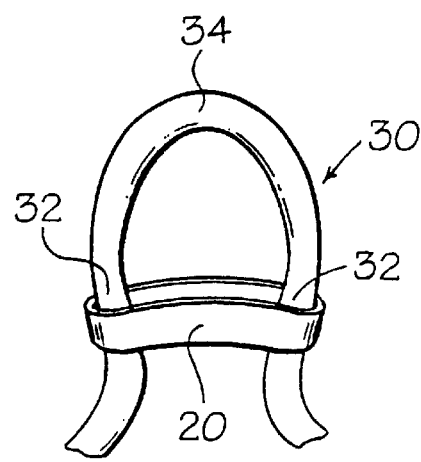
FIG 3b
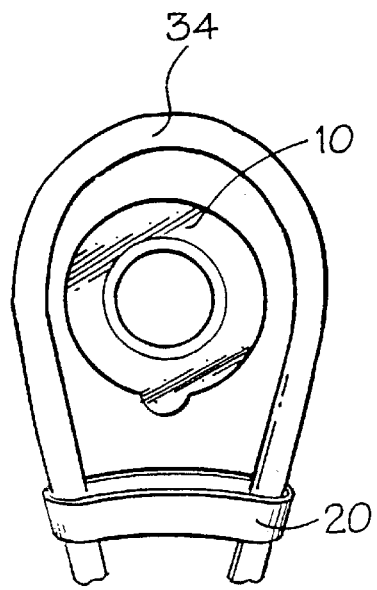
FIG 3c
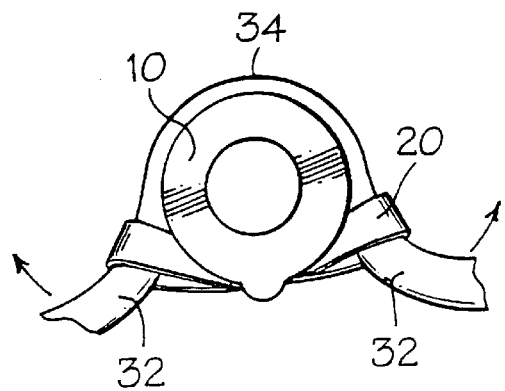
FIG 3d
FIG 3e
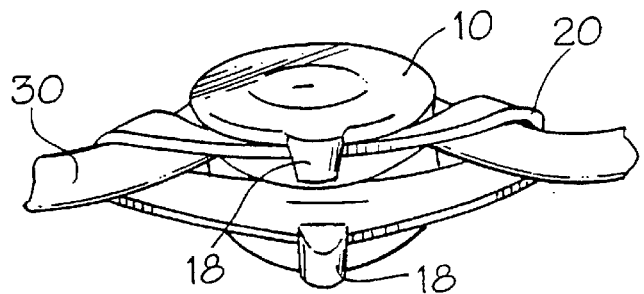

CABLE SHOCK ABSORBING DEVICE

The invention relates to a cable shock absorbing device for electric cables. Particularly, but not exclusively, the invention relates to a cable shock absorbing device for use in connection with electrical domestic appliances such as vacuum cleaners, hairdryers, other hair care appliances, power tools and other appliances which are manoeuvred during normal use.

Vacuum cleaners and other domestic or household electrical appliances incorporate electrical cables which remain connected to a mains socket whilst the device is manoeuvred during its normal use. The normal movement of a domestic vacuum cleaner includes reciprocal action across a floor to be cleaned and, in some cases, this movement can result in sharp increases in tension applied to the electric cable. Repeated jerkings of the electric cable contribute to the vulnerability of the cable to failure and are therefore preferably avoided. Unfortunately, normal domestic use of such machines can be reasonably vigorous and full elimination of sudden jerking movements of the electric cable of a vacuum cleaner or a similar device is impossible to achieve.

Some attempt has been made to introduce shock absorbing capabilities to cables to which sudden high loading is occasionally applied. An example of this is described in U.S. Pat. No. 4,992,629 which relates to apparatus for absorbing cable shock in underground cables. The disclosure details a three part housing inside which the cable is looped when it is not under tension. When the cable is placed under tension, the housing expands against the action of a return spring so as to allow the looped portion of the cable to extend. The damping action of the spring ensures that the increase in tension applied to the cable is absorbed. This type of arrangement is unsuitable for use in relation to the electric cable of a domestic appliance because of its complexity, cost and bulk. Furthermore, such a device would be difficult to fit retroactively to an existing appliance in order to extend the life of the cable.

It is an object of the present invention to provide a cable shock absorbing device suitable for use with domestic electrical appliances, particularly vacuum cleaners. It is a further object of the present invention to provide a cable shock absorbing device which is simple and easy to manufacture at low cost. It is a further object of the invention to provide a cable shock absorbing device which is compact and which does not compromise volume when the cable is stored. It is a further object of the invention to provide a shock absorbing device for an electric cable which can be quickly and easily fitted to the electric cable of an existing domestic appliance such as a vacuum cleaner.

The invention provides a shock absorbing device for an electric cable comprising a resilient member attachable to two spaced-apart portions of the cable so as to bias the said portions towards one another and to impart an arcuate shape to the cable between the said portions, the device further comprising a spacer member for location between the cable and the resilient member. Further and advantageous features are set out in the subsidiary claims.

The device of the invention is simple and easy to manufacture, thereby providing a low-cost solution to the problem of vigorous jerking movements being applied to electrical cables. The provision of the resilient member between two spaced-apart portions of the cable allows any jerking movement to be damped so that the risk of the life of the cable being reduced is itself reduced. The provision of the spacer member between the cable and the resilient member ensures that a minimum distance is maintained between the cable and the resilient member which, in some embodiments, means that the resilient member will be deformed by the spacer member as tensile stress is applied to the cable. This distortion of the resilient member increases the tensile stress within the resilient member and thus increases the resistance of the device to the "straightening" of the cable under axial forces. The effect is to provide a rising spring rate which is highly advantageous in preventing sudden jerking movements being applied to the cable of a domestic electrical appliance.

Further and more particular advantages of the arrangement of the invention will become clear during the following description of preferred embodiments of the invention which are given by way of example only.

In the drawings:

FIG. 1*a* is a front view of a spacer member forming part of a shock absorbing device according to the invention;

FIG. 1*b* is a side view of the spacer member of FIG. 1*a;*

FIG. 1*c* is a section through the spacer member of FIG. 1*a* taken along the line I—I;

FIG. 2 is a perspective view of a resilient member forming part of a shock absorbing device according to the invention;

FIGS. 3*a* to 3*e* illustrate a method by which the shock absorbing device of FIGS. 1 and 2 can be fitted to the cable of an electrical appliance;

FIG. 4*a* illustrates the device of FIGS. 1 to 3 in use in a relaxed state;

FIG. 4*b* illustrates the device of FIGS. 1 to 3 in use in a functioning state;

Figure 1A:
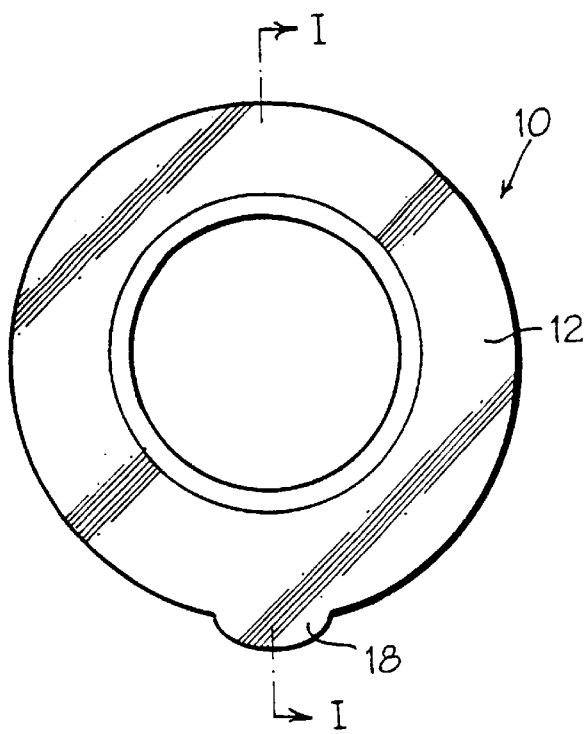
Figure 1B:
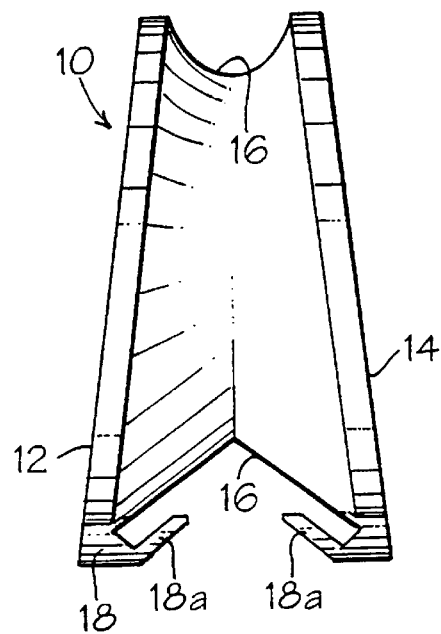
Figure 1C:
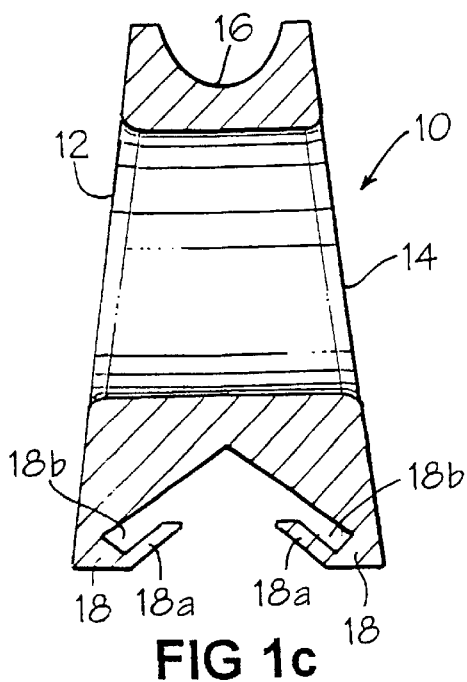
Figure 2:
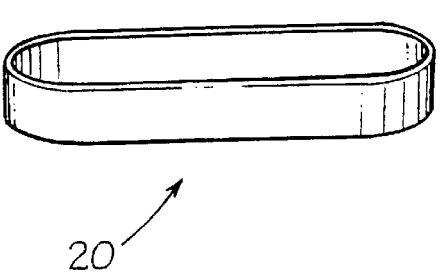

The components of a shock absorbing device according to the invention are illustrated in FIGS. 1 and 2. Essentially, the device consists of a spacer member 10 as shown in FIG. 1, and a resilient member 20 as shown in FIG. 2. The spacer member 10 is generally annular in shape and has two opposing faces 12, 14, each of which is planar. The planes of the opposing faces 12, 14 are inclined to one another at an angle of approximately 15°. Around the periphery of the spacer member 10 and lying between the opposing faces 12, 14 is an annular groove 16. In the area in which the faces 12, 14 are closest together, the groove 16 has a part-circular cross section as illustrated in FIGS. 1*b* and 1*c*. The groove 16 changes shape in the area in which the faces 12, 14 are furthest apart and adopts a triangular profile for reasons which will be explained below.

The spacer member 10 has retaining means 18 in the form of two opposing hook members located in the area in which the opposing faces 12, 14 are furthest apart. The hook members 18 extend generally inwardly of the spacer member 10 towards one another and comprise upwardly extending hook portions 18*a*. The hook portions 18*a* extend generally parallel to the triangular surface of the groove 16 and, together with the triangular surface of the groove 16, delimit two opposing channels 18b. The purpose of the opposing channels will be described and explained below.

In the embodiment illustrated, the outer diameter of the spacer member is approximately 27 mm and the diameter of the central aperture is approximately 14 mm. The groove 16 has a diameter of approximately 6 mm and the width of the opposing channels 18b is approximately 2 mm. The spacer member 10 is manufactured by moulding from a plastics material such as polyethylene. The hook members 18 are formed integrally with the member 10 during manufacture. The simplicity of the shape of the spacer member 10 makes it easy and cheap to produce. The function of the annular shape, apart from the aesthetic aspects, is to reduce the weight of the spacer member 10 as far as possible and to provide for easy handling and manipulation. It will be appreciated that the diameter of the groove 16 can be varied to accommodate different sizes of cable and, ideally, the groove is dimensioned to match the cable diameter.

The resilient member 20 illustrated in FIG. 2 is an essential component of the shock absorbing device of the invention. The resilient member 20 is formed by a simple band made from synthetic rubber and possessing the resilient characteristics necessary to resist repeated deformation over a significant period of time. The material must also be capable of resisting deterioration due to environmental factors such as the effects of ozone and UV light. Ideally, the band 20 has a rectangular cross section with the depth of the band being between 2 and 4 times the thickness thereof. In the preferred embodiment, the depth of the band is substantially 7 mm and the thickness is substantially 2.3 mm. If the band were to be formed into a circular shape in the relaxed state, it would have a diameter of approximately 17 mm. The band 20 can be formed by any known method.

The preferred method of applying the device described above to a cable in order to provide the cable with a shock absorbing capability and thus reduce the vulnerability of the cable to failure due to repeated jerking movements will now be described with reference to FIG. 3. Initially, as shown in FIG. 3a, the cable 30 is formed into a loose U shape and the cable is passed through the resilient band 20 as shown in FIG. 3b so that the arms 32 of the U shape are held together by the resilient band 20. At this stage, the size of the U shape is significantly greater than the dimensions of the spacer member 10. The spacer member 10 is then introduced to the interior of the U shaped part of the cable between the base 34 of the U shape and the resilient band 20 as shown in FIG. 3c. The size of the U shape allows the spacer member 10 to be easily inserted into this space. The arms 32 of the U shape of the cable are then pulled apart so as to force the resilient member 20 closer to the base 34 of the U shape until it comes into contact with the spacer member 10. The fact that the opposing faces 12, 14 of the spacer member 10 are relatively widely spaced apart in this area, together with the fact that the resilient member is under tension at this stage, means that the resilient member 20 will tend to pass into the groove 16 rather than over the outer surfaces of the faces 12, 14. The inclined hook portions 18a will also encourage the resilient member to pass into the interior of the groove 16.

Continued and increased application of tension to the arms 32 of the U shape of the cable will then force the resilient member 20 further into the groove 16. The geometry of the device will then encourage the resilient band 20 to become lodged in the opposing channels 18b as shown in FIG. 3e. Because the lodging of the resilient member 20 in the channels 18b takes place when the band 20 is under a substantial amount of tension, the thickness of the band 20 at the appropriate time is reduced compared to its normal thickness. The band 20 is thus able to enter the channels 18b, despite the fact that the depth of the channels is less than the thickness of the band when in its relaxed state. However, when the cable is released and the device is allowed to take up its relaxed state position, the thickness of the resilient band returns to normal and the band 20 becomes gripped by the hook portions 18. The band 20 is thus held fixedly on the spacer member 10 during normal use. This has the advantage that, should the resilient band 20 break, the band will be held securely on the spacer member by one or other of the hook portions 18 and the risk of injury to a user or other person will be greatly reduced in comparison to the risk if the band 20 were not so held. Once the resilient member 20 has been brought into the position shown in FIG. 3e, the tension in the cable 30 can be released. The resilient band 20 will remain in contact with the cable 30 at the points to which it was forced to move during the installation process but will be held at. these points merely by friction between the cable 30 and the band 20. If the cable to which the device is to be applied is coated or sheathed with a material which is not conducive to the maintenance of the resilient member 20 at the appropriate points, then the resilient member may need to be coated with a suitable slip-resistant material or else the resilient band 20 can be affixed to the cable 30 after installation, for example, by adhesives.

Figure 4A:
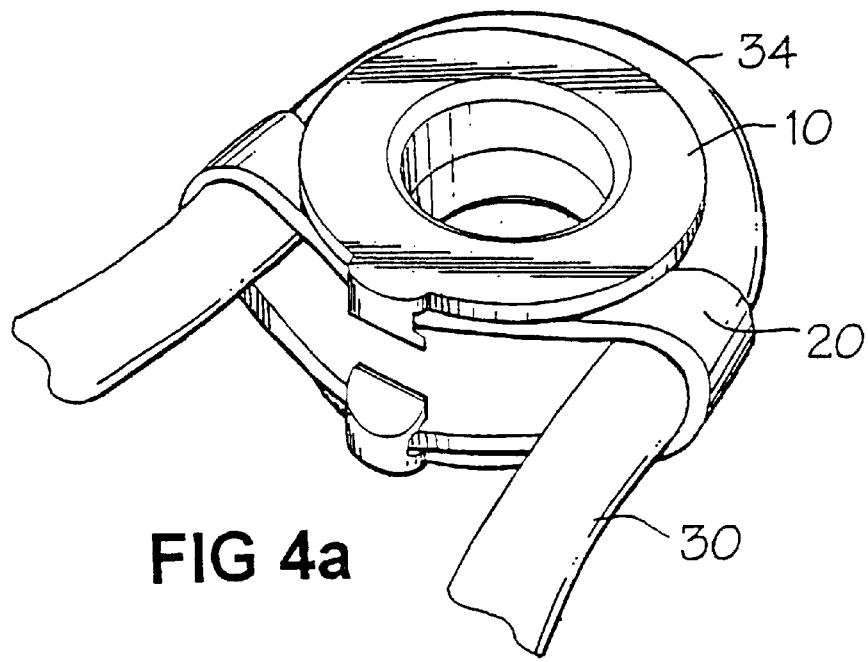
Figure 4B:
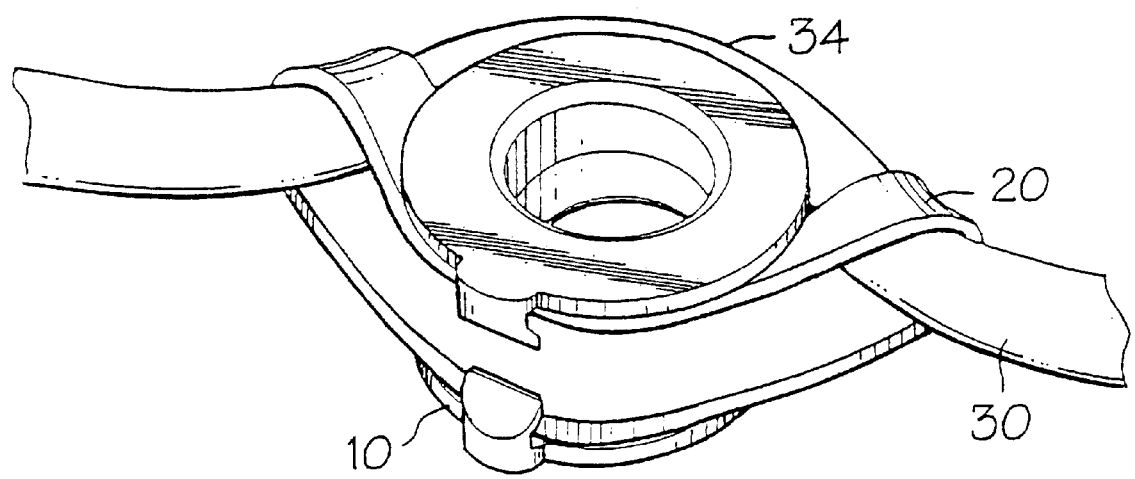

The shock absorbing device of FIGS. 1 to 3 is shown in functioning modes in FIGS. 4a and 4b. FIG. 4a shows the device in a relaxed state. This is a state in which the cable to which the device is attached is not under any significant tensile loading. As can be seen from the Figure, the cable is held in a U shape under the action of the resilient member 20 and the spacer member 10 is held securely between the base 34 of the U shape and the resilient member 20. Beyond the U shape, the cable 30 is able to follow any desired shape appropriate to the use of the appliance to which the cable 30 is attached.

When the cable 30 is placed under tension, the device adopts the position shown in FIG. 4b. As the cable 30 is tensioned, so the arms 32 of the U shape are moved away from one another as shown. The portions of the cable 30 which the resilient member 20 contacts are thereby moved away from one another as well and the resilient member 20 is forced to extend in a resilient manner. Because the cable 30 is initially wrapped around the spacer member 10, this tensioning of the cable causes some "unwrapping" from the spacer member 10. Because the spacer member 10 is held between the base 34 of the U shape and the band 20, the resilient member 20 begins to wrap itself around the spacer member 10. The spacer member 10 holds the resilient member 10 at a fixed distance from the base 34 of the U shape. This forces the resilient member 20 to follow an arcuate path between the two points at which the resilient member 20 contacts the cable 30. This non-linear relationship between the distance moved by the points of contact between the cable 30 and the band 20 and the resilient force created in the band 20 means that the effect is the same as that of a shock absorber having a rising spring rate. Essentially, this means that, if the contact points between the cable 30 and the band 20 are moved apart by a fixed distance, the force required to achieve this will increase with the initial distance between the points of contact. The advantage of this is that the force required to completely straighten the cable 30 will be very high and the risk of allowing a jerking movement to be applied to the cable will be greatly diminished. All jerking movements applied, inadvertently or otherwise, to the cable will be damped by the shock absorbing device. The life of a cable incorporating this type of device will therefore be less prone to failure as a result of jerking movements applied during use.

The rising spring rate effect mentioned above has been tested and proven to exist in the device described above. In a laboratory experiment, a first band having the dimensions given above was loaded axially in order to extend or stretch the band by predetermined amounts. The load required to achieve the extension was then measured. Similarly, a cable incorporating a shock absorbing device as described above was placed under load and made to extend under the loading by predetermined amounts. The load required to effect the required extension or stretch was again measured.

Figure 5:
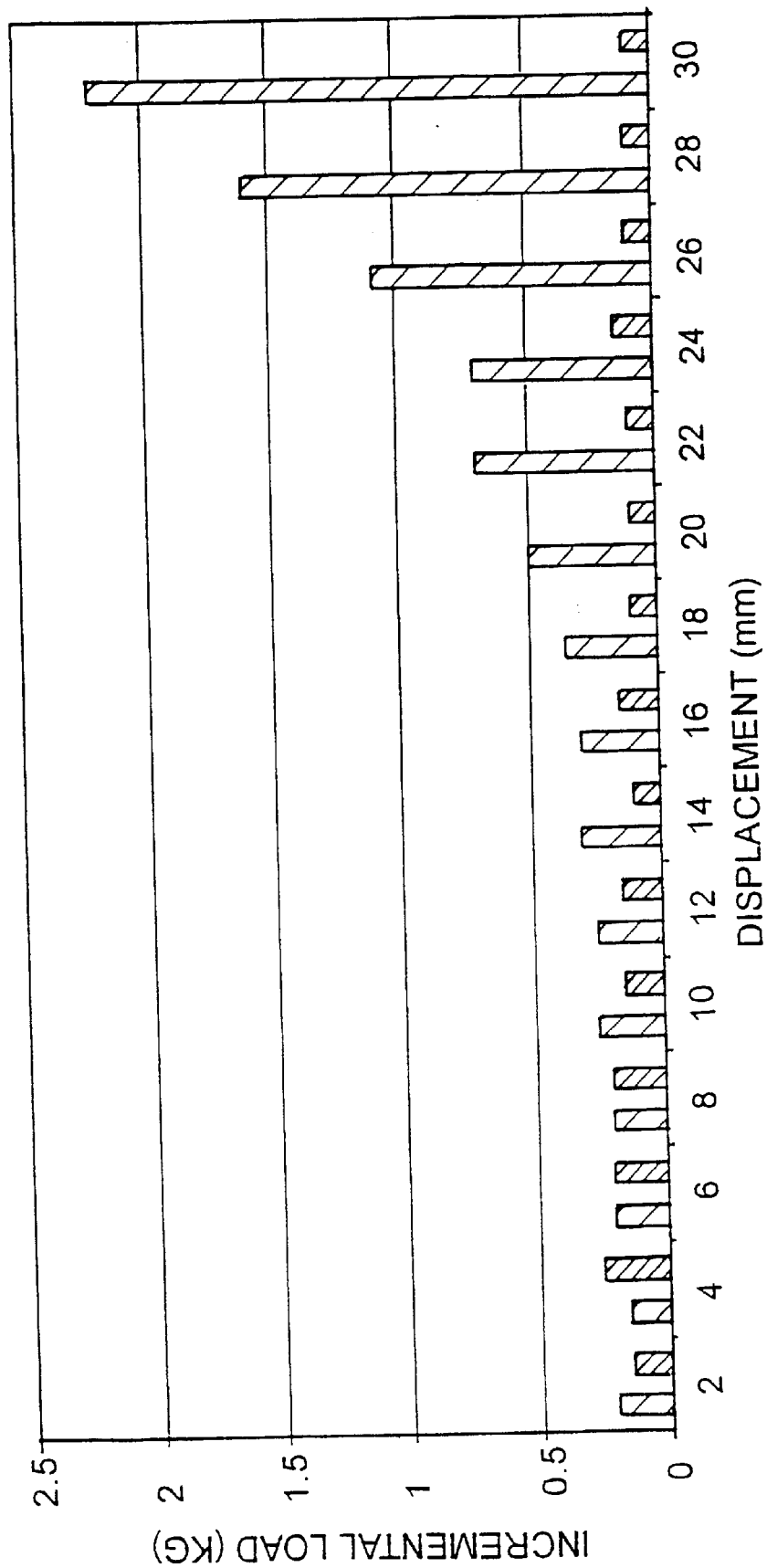
FIG. 5 is a graph showing the results of testing carried out in respect of the resilient member forming part of the shock absorbing device shown in FIGS. 1 to 4.

The graph shown in FIG. 5 illustrates the additional loading required to increase the displacement of each test device by an increment of 2 mm from zero displacement to 30 mm displacement. The light columns show the additional loading required to displace the rubber band whilst the dark columns show the additional loading required to displace the shock absorbing device described above. It is clear from the results illustrated in the graph that, the more the shock absorbing device is loaded, the greater the force required to displace the device by a predetermined amount. The presence of a rising spring rate effect is quite clear.

Figure 6A:
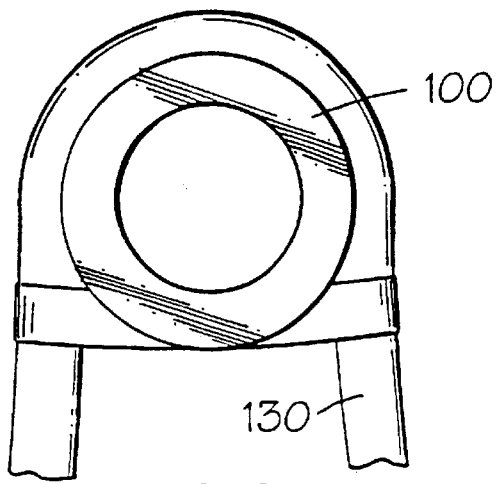
FIGS. 6 to 8 show, in side view, alternative embodiments of a device according to the invention having resiliently deformable spacer members.
Figure 6B:
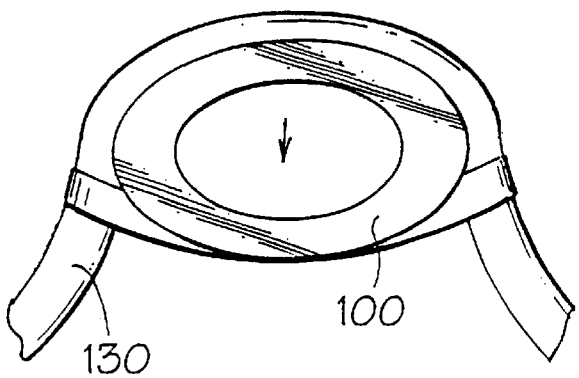
Figure 7:
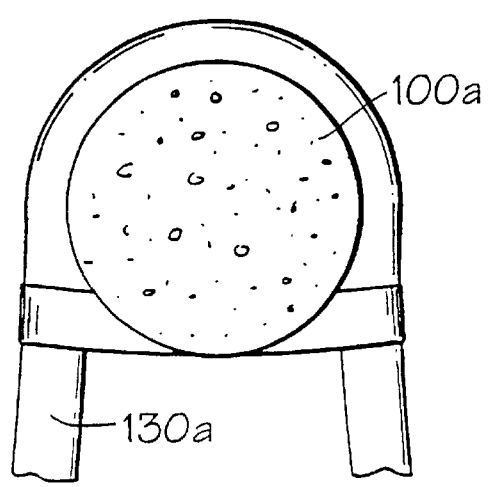
Figure 8:
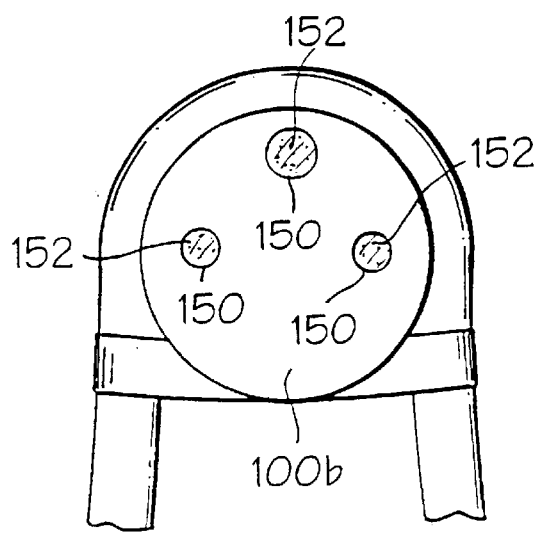

The invention is not limited to the precise details of the embodiment described above. It will be appreciated, for example, that the spacer member need not be absolutely rigid and that a similar effect can be achieved if the spacer member were made from, for example, a dense rubber or synthetic rubber. FIGS. 6 to 8 illustrate embodiments in which the spacer member is made resiliently deformable. In FIG. 6, the spacer member 100 is annular when the cable is not under tension (see FIG. 6a) but can be deformed when the cable 130 is under tension as shown in FIG. 6b. The spacer member 100a could also be made from a highly resilient material such as a foamed rubber as shown in FIG. 7. Such a spacer member 100a would then deform from a circular shape into a distorted oval shape when the cable 130a was put under tension. A further alternative is illustrated in FIG. 8 which shows a mildly resilient spacer member 100b having a plurality of cut-out portions 150 within the circular periphery of the spacer member 100b. These cut-out portions 150 contain plugs 152 of readily-deformable material which allow the spacer member 100b to deform. The cut-out portions 150 can be located at any suitable place within the confines of the spacer member 100b.

Figure 9A:
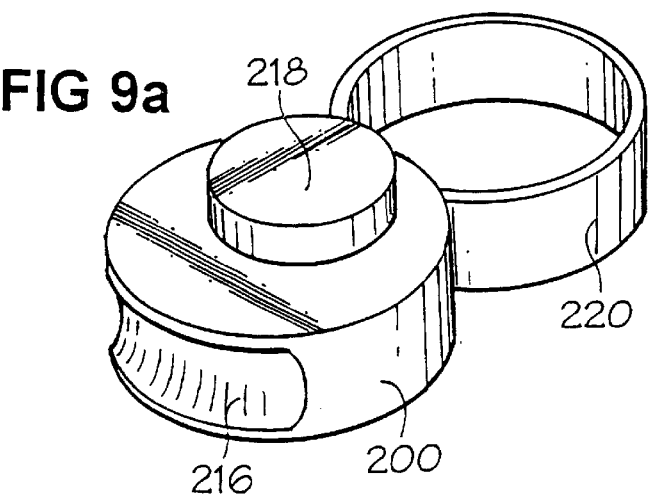
FIG. 9 illustrates further embodiments of the invention in which the resilient member is formed integrally with or fixedly attached to the spacer member.
Figure 9B:
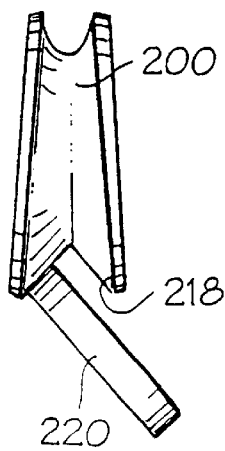
Figure 9C:
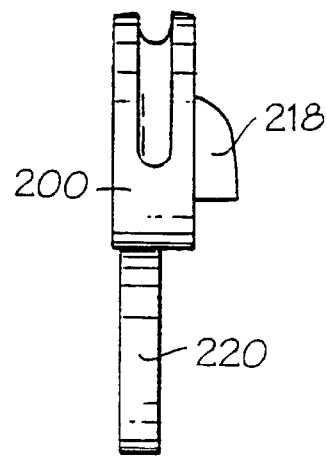
Figure 9D:
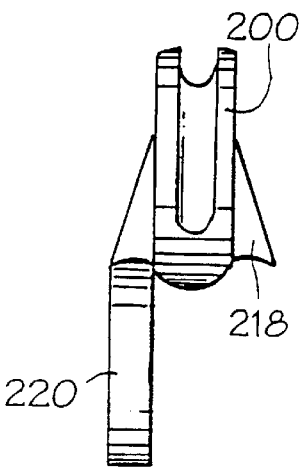

Manufacturing the spacer member and resilient member from a mouldable material such as rubber or a synthetic rubber would allow the entire device to be manufactured as a single piece if desired, ie with the resilient band formed integrally with the spacer member. One advantage of manufacturing the device as a single piece is that the two parts of the device shown in FIGS. 1 to 4 can never then become separated so that the device becomes useless. Loss or misplacement of the resilient member might encourage a user to substitute a band of different dimensions and resilience which could easily be inferior in performance or could on occasion be dangerous. An embodiment of a single piece device is shown and illustrated in FIG. 9. FIG. 9a shows a spacer member 200 moulded from a rubber or synthetic rubber and having a groove 216 around the periphery thereof as has been previously described. The resilient member 220, in the form of a rubber band, is moulded integrally therewith and is joined to the spacer member 200 on the side of the spacer member 200 opposite the groove 216. The spacer member 200 also has an outwardly projecting stopper 218 for retaining the band 220 on the correct side of the spacer member 200. In use, the cable is formed into a U shape and the base of the U shape is passed through the band 220. The spacer member 200 is then turned so that it lies in the same plane as the cable and placed within the U shape between the base thereof and the band 220. The cable is then pulled outwardly to press the band 220 against the spacer member 200 and thereby hold it in position. The stopper 218 prevents the free side of the band 220 from slipping past the spacer member 200. Alternative arrangements having equivalent parts are illustrated in FIGS. 9b, 9c and 9d.

It is equally possible to form the device from a spacer member and a resilient member which have been manufactured separately but which are fixed together during manufacture so as to be inseparable thereafter. This also alleviates the problem of the two parts of the device described in detail above becoming separated and one or the other being misplaced. In each of the embodiments shown in FIGS. 9a to 9d, the spacer member and band can be manufactured separately and fixedly joined together by, for example adhesion.

Figure 10:
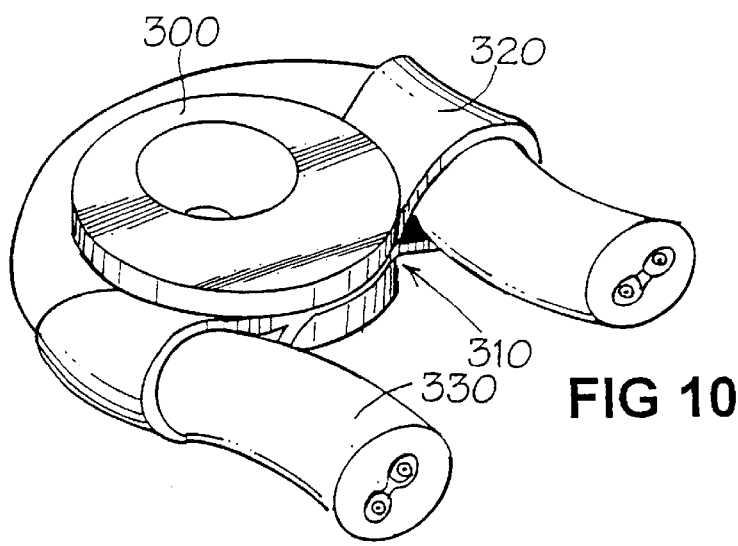
FIGS. 10 to 12 illustrate further embodiments of the invention in which the resilient member is retained at a fixed distance from the cable by different means.
Figure 11:
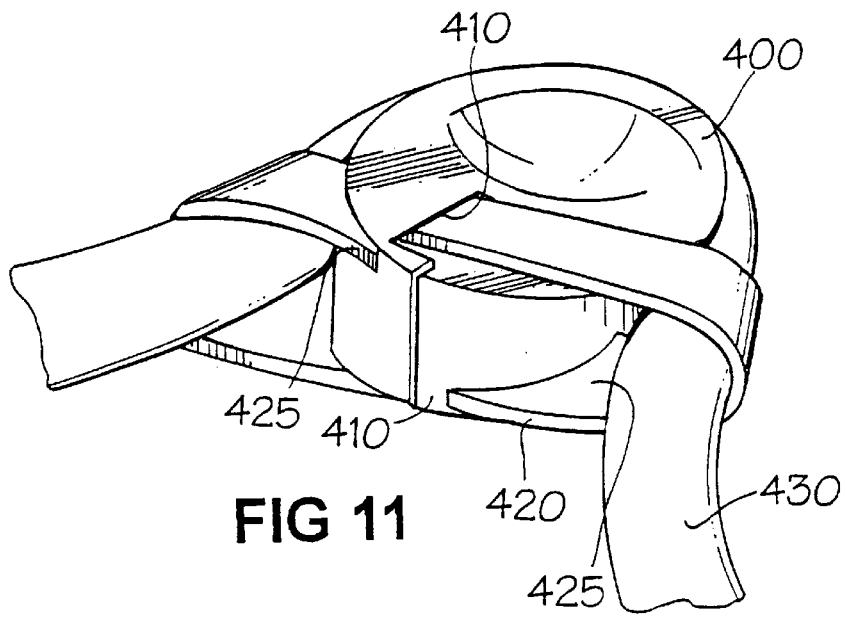
Figure 12:
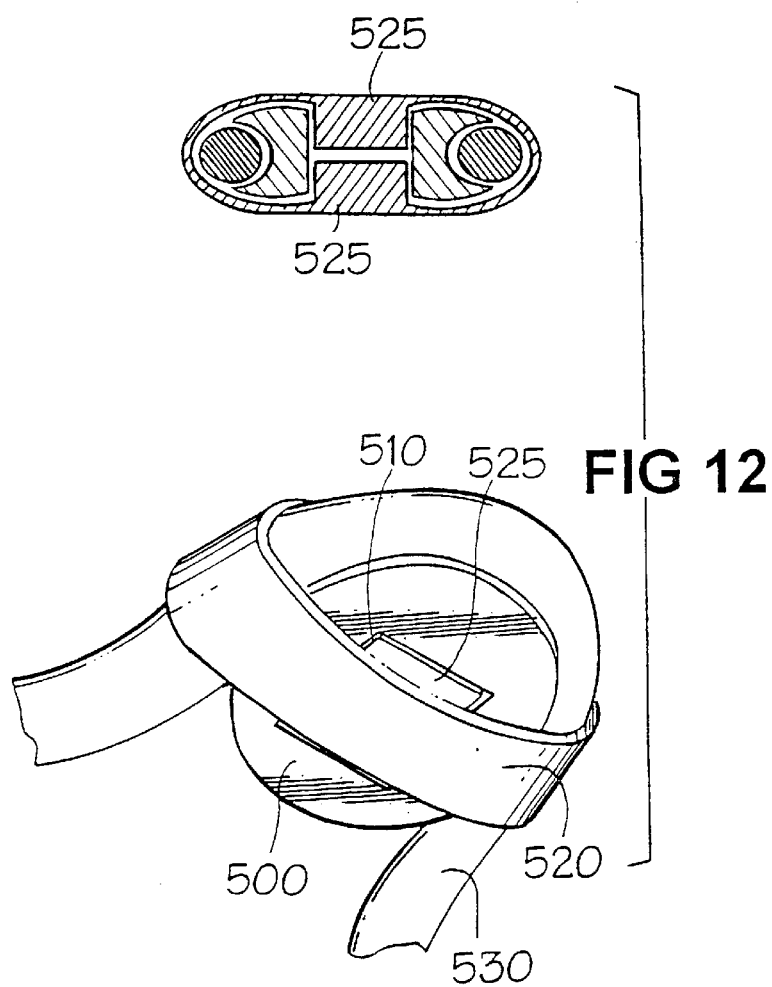

There are also ways of holding the resilient member against the spacer member other than that shown in the drawings so far described. FIG. 10 shows an arrangement in which the spacer member 300 has a slot 310 arranged in the side thereof opposite the groove which receives the cable 330. When the device is placed in position, the portions of the band 320 which lie between the cable portions are received into the slot 310 so that further movement of the band 320 towards the base of the U shape of the cable 330 is prevented. FIG. 11 shows a further alternative arrangement in which the ends 425 of the band 420 are fixedly attached to the spacer member 400 and the centre portion of the band 420 is received in a radial slot 410 formed in the spacer member 400. The spacer member 400 maintains the band 420 at a fixed distance from the cable 430. FIG. 12 shows an embodiment in which the band 520 itself carries inwardly projecting portions 525 which are received in recesses 510 in the spacer member 500 in order to maintain the band 520 at a fixed distance from the cable 530. These embodiments are all equally viable and are intended to fall within the scope of the invention.

The skilled reader will also appreciate that the spacer member is not required to be circular or annular in shape. The requirement is that the spacer member spaces the base of the U shape away from the resilient member in order to maintain the base and the resilient member at a fixed minimum distance. This ensures that the "unwrapping" of the cable from the spacer member causes the resilient member to wrap, at least partly, around the spacer member. It is this action which creates the rising spring rate effect and ensures that the damping of jerking movements applied to the cable is effective. This can be achieved merely by the provision of bracing arms or stops on a small spacer member, the bracing arms serving to hold the cable away from the resilient member without forcing the cable to follow a predetermined circular path.

Figure 13:
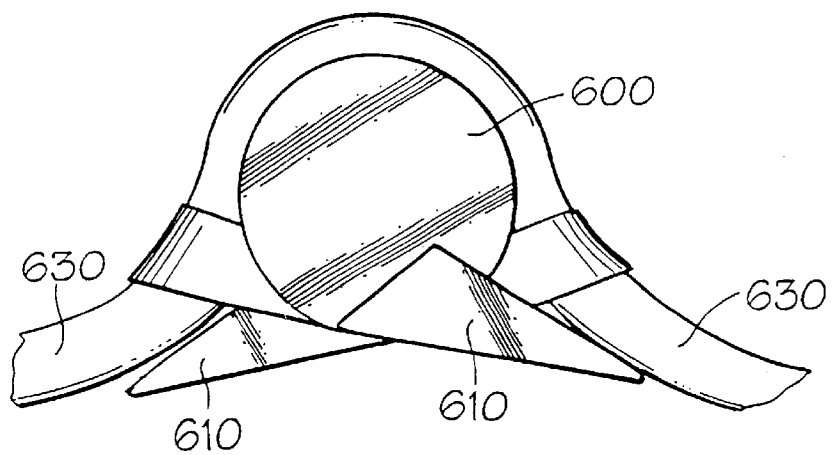
FIG. 13 illustrates an embodiment of the invention incorporating bracing arms designed to guide the cable into a linear shape outside the confines of the device.

It is also considered advantageous if the cable is guided into a linear shape outside the confines of the devices illustrated above. FIG. 13 shows an embodiment which includes bracing arms 610 located on the spacer member 600. These bracing arms 610 guide the cable 630 back into a linear shape outside the confines of the device.

Another advantageous feature is the provision of a cable protecting sheath or cover which will enclose the cable as it passes around the spacer member. The sheath or cover can be manufactured with the devices described above, or else it can be manufactured separately and fitted to the device after installation. The sheath or cover can take the form of a plastics moulded cover which can be snap-fitted to the spacer member so as to cover the part of the cable which, in use, is wrapped around the spacer member. This would protect the user of an appliance powered by means of the cable in the event of a failure of the cable at the point at which the device is fitted.

The resilient member is here described as a simple elastomeric band. It will be appreciated that the same effects can be achieved using other resilient members such as tension springs and solid elastomeric members. The simple band is preferred in the embodiment illustrated for reasons of ease of application, but other types of resilient member are equally suitable.

What is claimed is:

1. A shock absorbing device for an electric cable comprising a resilient member attachable to two spaced-apart portions of the cable so as to bias the said portions towards one another and to impart an arcuate shape to the cable between the said portions, the device further comprising a spacer member for location between the cable and the resilient member.

2. A shock absorbing device as claimed in claim 1, wherein retaining means for retaining the resilient member in contact with the spacer member are provided on the spacer member.

3. A shock absorbing device as claimed in claim 2, wherein the retaining means comprise at least one hook shaped member.

4. A shock absorbing device as claimed in claim 3, wherein the or each hook shaped member delimits a groove in which the resilient member is, in use, retained.

5. A shock absorbing device as claimed in claim 4, wherein the width of the or each groove is less than the thickness of the resilient member when in a relaxed state.

6. A shock absorbing device as claimed in claim 1, wherein, in use, the cable forms a U shape between the two spaced-apart portions, the arms of the U shape being connected together by the resilient member and the spacer member being located between the resilient member and the base of the U shape.

7. A shock absorbing device as claimed in claim 6, wherein the spacer member has at least one bracing portion for urging the cable, outside the U shape, into a linear shape.

8. A shock absorbing device as claimed in claim 7, wherein a cable protecting cover or sheath is provided to cover the cable, at least in part, lying in use between the two spaced-apart portions thereof.

9. A shock absorbing device as claimed in claim 6, wherein, in use, the application of a tensile force to the cable results in the resilient member becoming wrapped at least partly around the spacer member.

10. A shock absorbing device as claimed in claim 1, wherein the spacer member has two opposing faces, the planes of the opposing faces being inclined to one another.

11. A shock absorbing device as claimed in claim 10, wherein the retaining means are provided on the spacer member in the area in which the planes of the opposing faces are furthest apart.

12. A shock absorbing device as claimed claim 1, wherein the resilient member comprises a resilient band.

13. A shock absorbing device as claimed in claim 12, wherein the resilient member is made from rubber or a rubberised plastics material.

14. A shock absorbing device as claimed in claim 1, wherein, in use, the resilient member acts directly on the cable.

15. A shock absorbing device as claimed in claim 14, wherein, in use, the resilient member is retained on the cable solely by frictional forces.

16. A shock absorbing device as claimed in claim 1, wherein the member is formed separately from the spacer member.

17. A shock absorbing device as claimed in claim 16, wherein the resilient member and the spacer member are fixedly connected together.

18. A cable comprising a shock absorbing device as claimed in claim 1.

19. A vacuum cleaner comprising a cable as claimed in claim 18.

20. A shock absorbing device as claimed in claim 1, wherein, in use, the cable is wrapped around at least part of the spacer member.

21. A shock absorbing device as claimed in claim 1, wherein the spacer member is circular.

22. A shock absorbing device as claimed in claim 1, wherein the spacer member is annular.

23. A shock absorbing device as claimed in claim 1, wherein the resilient member and the spacer member are formed integrally.

24. A cable comprising a plurality of shock absorbing devices as claimed in claim 1.

25. A shock absorbing device for an electrical cable, comprising a resilient member attachable to two spaced-apart portions of the cable so as to bias the spaced-apart portions toward one another and to impart an arcuate shape to the cable between the spaced-apart portions, the device further comprising a spacer member for location between the cable and the resilient member, wherein the spacer member has a groove located around the periphery thereof for receiving the cable.

* * * * *